(12) United States Patent
Wu et al.

(10) Patent No.: US 11,892,678 B2
(45) Date of Patent: Feb. 6, 2024

(54) PHOTONIC DEVICE AND METHOD OF MAKING SAME

(71) Applicant: TAIWAN SEMICONDUCTOR MANUFACTURING COMPANY, LTD., Hsinchu (TW)

(72) Inventors: Chien-Ying Wu, Hsinchu (TW); Yuehying Lee, Hsinchu (TW); Sui-Ying Hsu, Hsinchu (TW); Chen-Hao Huang, Hsinchu (TW); Chien-Chang Lee, Hsinchu (TW); Chia-Ping Lai, Hsinchu (TW)

(73) Assignee: TAIWAN SEMICONDUCTOR MANUFACTURING COMPANY, LTD., Hsinchu (TW)

( * ) Notice: Subject to any disclaimer, the term of this patent is extended or adjusted under 35 U.S.C. 154(b) by 30 days.

(21) Appl. No.: 17/412,930

(22) Filed: Aug. 26, 2021

(65) Prior Publication Data
US 2023/0068603 A1 Mar. 2, 2023

(51) Int. Cl.
*G02B 6/12* (2006.01)
*G02B 6/30* (2006.01)
*G02B 6/34* (2006.01)

(52) U.S. Cl.
CPC .............. *G02B 6/12* (2013.01); *G02B 6/30* (2013.01); *G02B 6/34* (2013.01)

(58) Field of Classification Search
CPC .......... G02B 6/34; G02B 6/30; G02B 6/1347; G02B 6/136; G02B 6/12
See application file for complete search history.

(56) References Cited

U.S. PATENT DOCUMENTS

| | | | |
|---|---|---|---|
| 2015/0260913 A1* | 9/2015 | Li | G02B 6/124 385/14 |
| 2021/0389526 A1* | 12/2021 | Kuo | G02B 6/124 |
| 2022/0276452 A1* | 9/2022 | Freedman | G02B 6/4206 |

\* cited by examiner

*Primary Examiner* — Michael P Mooney
(74) *Attorney, Agent, or Firm* — Hauptman Ham, LLP (57) ABSTRACT

A photonic device includes a silicon layer, wherein the silicon layer extends from a waveguide region of the photonic device to a device region of the photonic device, and the silicon layer includes a waveguide portion in the waveguide region. The photonic device further includes a cladding layer over the waveguide portion, wherein the device region is free of the cladding layer. The photonic device further includes a low refractive index layer in direct contact with the cladding layer, wherein the low refractive index layer comprises silicon oxide, silicon carbide, silicon oxynitride, silicon carbon oxynitride, aluminum oxide or hafnium oxide. The photonic device further includes an interconnect structure over the low refractive index layer.

20 Claims, 8 Drawing Sheets

PHOTONIC DEVICE AND METHOD OF MAKING SAME

BACKGROUND

Optical gratings are usable for directing optical signals between a chip and an optical fiber. Optical gratings are usable for directing optical signals from the chip to the optical fiber as well as directing optical signals from the optical fiber to the chip. The ability of the optical grating to effectively couple the chip to the optical fiber is based on alignment between the optical signal and the optical grating. A waveguide in optical communication with the optical grating carries the optical signal between the grating and optoelectronic devices within the chip.

A cavity is formed in the layers of the chip between the optical fiber and the optical grating in order to reduce signal loss for the optical signal passing through the layers of the chip. Signal loss is also possible during propagation of the optical signal along the waveguide to or from the optoelectronic devices. The signal loss is due to absorption, reflection, refraction, etc.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

The following disclosure provides many different embodiments, or examples, for implementing different features of the provided subject matter. Specific examples of components, values, operations, materials, arrangements, or the like, are described below to simplify the present disclosure. These are, of course, merely examples and are not intended to be limiting. Other components, values, operations, materials, arrangements, or the like, are contemplated. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

As an optical signal propagates along a waveguide, the optical signal is reflected back into the waveguide at an interface between the waveguide and a cladding layer. The reflection is due to a refractive index difference between the waveguide and the cladding layer. Despite the reflection, a portion of the light passes into the cladding layer. This portion of the light is then reflected back toward the waveguide at an interface between the cladding layer and a surrounding material. However, at each reflection some of the optical signal is lost due to absorption by the surrounding material. The absorption reduces an intensity or strength of the optical signal. As the intensity of the optical signal decreases, a signal to noise ratio of the optical signal is reduced and reliability of information conveyed by the optical signal is also reduced.

In some approaches, a contact etch stop layer (CESL) including a high refractive index material, such as silicon nitride, forms the interface with the cladding layer. The CESL helps to control an etching process in a device area of a chip in order to improve precision in forming electrical contact with components in the chip. However, the CESL also exhibits high absorption of the optical signal when the optical signal is reflected at an interface between the CESL and the cladding layer. As a result, the intensity of the optical signal is reduced. By removing the CESL from forming an interface with the cladding layer or by forming a low-refractive index layer between the cladding layer and the CESL, absorption of the optical signal is reduced. The reduced amount of absorption helps to maintain an intensity of the optical signal during propagation along the waveguide and increased precision in conversion of the optical signal to an electrical signal by the optoelectronic device.

Figure 1:
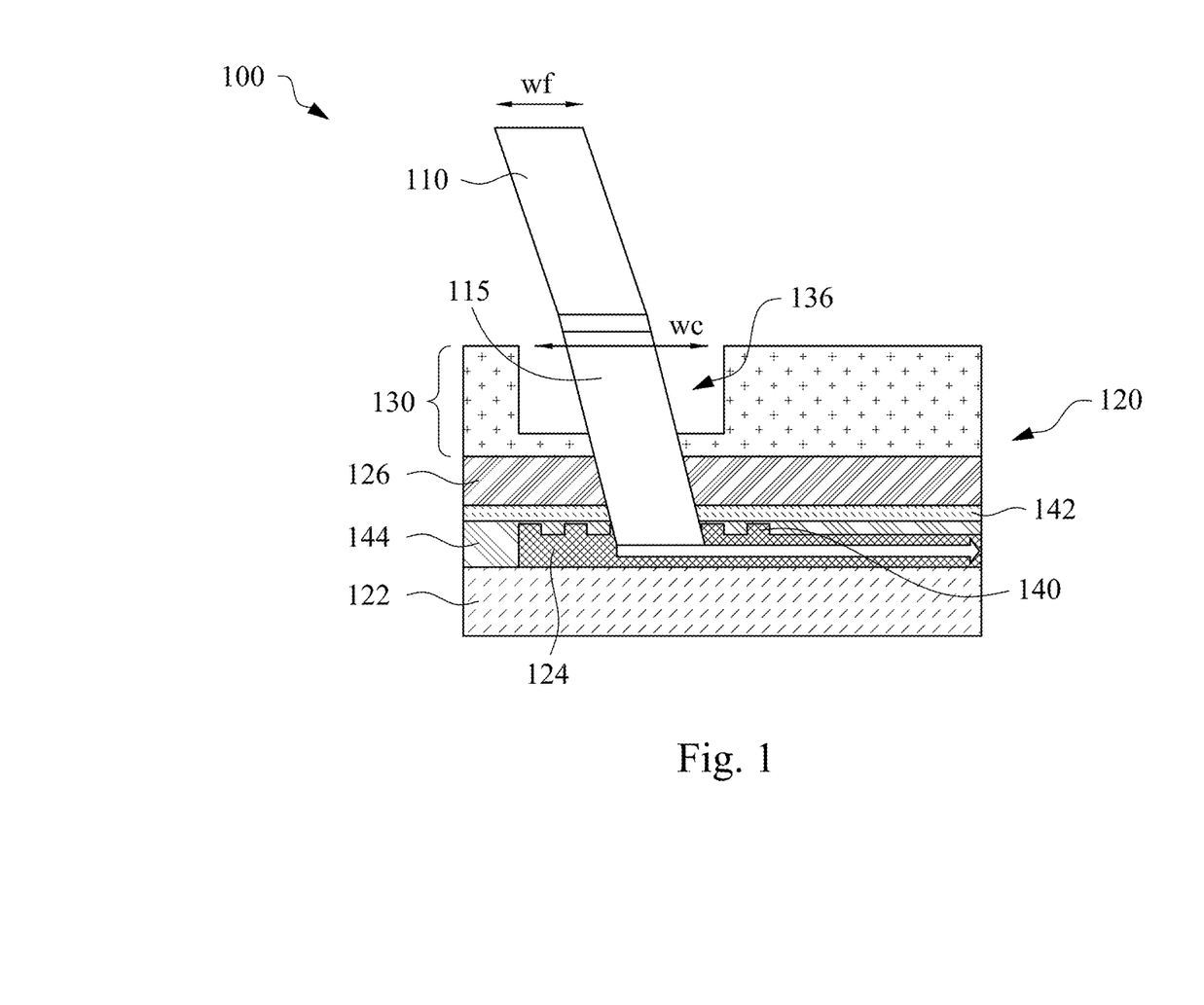
FIG. 1 is a cross-sectional view of a fiber to chip coupling system in accordance with some embodiments.

FIG. 1 is a cross sectional view of a fiber to chip coupling system 100 in accordance with some embodiments. System 100 includes an optical fiber 110 configured to emit an optical signal 115. System 100 further includes a chip 120. Chip 120 includes a substrate 122. A waveguide layer 124 is over the substrate 122. An inter-layer dielectric (ILD) 126 is over the waveguide layer 124. An interconnect structure 130 is over the ILD 126. One of ordinary skill in the art would recognize that the interconnect structure 130 includes multiple inter-metal dielectric (IMD) layers and conductive layers in order to electrically connect different components of the chip 120. A cavity 136 extends at least partially through the interconnect structure 130. In some embodiments, the cavity 136 extends through an entirety of the interconnect structure 130. In some embodiments, the cavity 136 extends through the ILD 126. A grating 140 extends from the waveguide layer 124 and is configured to receive the optical signal 115 passing through the cavity 136, any remaining portion of the interconnect structure 130, and the ILD 126. The grating 140 is configured to direct the optical signal 115 into the waveguide layer 124 to components within the chip 120. The system 100 further includes a low refractive index layer 142 between the ILD 126 and the waveguide layer 124. A cladding layer 144 is between the waveguide layer 124 and the low refractive index layer 142. One of ordinary skill in the art would recognize that additional layers, such as reflective layers, are included in the system 100 according to some embodiments.

The optical fiber 110 is a single mode optical fiber having a width wf ranging from about 8 microns (μm) to about 12 μm. In some embodiments, the optical fiber 110 is a multi-mode optical fiber having a width wf ranging from about 45 μm to about 70 μm. The width wf is based on a size of a core of the optical fiber 110 including any additional cladding or cover layers. If the width wf is too large, then the size of the optical fiber 110 is unnecessarily increased. If the width wf is too small, then there is a risk of loss of optical signal from the core or interference of the optical signal from external light sources. The optical fiber 110 is configured to convey the optical signal 115 from an external device to chip 120. The optical fiber 110 is aligned with the cavity 136 in order for the optical signal 115 to efficiently couple to the grating 140.

The optical signal 115 has a wavelength. In some embodiments where the optical fiber 110 is a single mode fiber, the wavelength of the optical signal 115 ranges from about 1260 nanometers (nm) to about 1360 nm. In some embodiments where the optical fiber 110 is a multimode optical fiber, the wavelength of the optical signal 115 ranges from about 770 nm to about 910 nm. The wavelength of the optical signal 115 is based on a light source used to generate the optical signal. In some embodiments where the optical fiber 110 is a single mode optical fiber, the light source is a laser or a laser diode. In some embodiments where the optical fiber 110 is a multimode optical fiber, the light source of the optical fiber is a light emitting diode (LED). The optical signal 115 will diverge upon exiting the optical fiber 110.

The chip 120 includes at least one optoelectronic component, such as a laser driver, digital control circuit, photo-detectors, waveguides, small form-factor pluggable (SFP) transceiver, High-speed phase modulator (HSPM), calibration circuit, distributed Mach-Zehnder Interferometer (MZI), grating couplers, light sources, (i.e., laser), etc. The optoelectronic component is configured to receive the optical signal 115 from the waveguide layer 124 and convert the optical signal 115 into an electrical signal. While the description of FIG. 1 is written as the chip 120 receiving the optical signal 115 from the optical fiber 110, one of ordinary skill in the art would understand that the system 110 is also usable to transfer an optical signal from the chip 120 to the optical fiber 110. That is, the optoelectronic component generates the optical signal, which is then transferred to the optical fiber 110 through the waveguide layer 124 and the grating 140, in some embodiments.

In some embodiments, substrate 122 includes an elementary semiconductor including silicon or germanium in crystal, polycrystalline, or an amorphous structure; a compound semiconductor including silicon carbide, gallium arsenic, gallium phosphide, indium phosphide, indium arsenide, and indium antimonide; an alloy semiconductor including SiGe, GaAsP, AlInAs, AlGaAs, GaInAs, GaInP, and GaInAsP; any other suitable material; or combinations thereof. In some embodiments, the alloy semiconductor substrate has a gradient SiGe feature in which the Si and Ge composition change from one ratio at one location to another ratio at another location of the gradient SiGe feature. In some embodiments, the alloy SiGe is formed over a silicon substrate. In some embodiments, substrate 122 is a strained SiGe substrate. In some embodiments, the semiconductor substrate has a semiconductor on insulator structure, such as a silicon on insulator (SOI) structure. In some embodiments, the semiconductor substrate includes a doped epi layer or a buried layer. In some embodiments, the compound semi-conductor substrate has a multilayer structure, or the substrate includes a multilayer compound semiconductor structure.

The waveguide layer 124 is configured to direct the optical signal 115 from the grating 140 to an optoelectronic component of the chip 120. The waveguide layer 124 includes an optical transparent material. In some embodiments, the waveguide layer 124 includes silicon. In some embodiments, the waveguide layer 124 includes plastic. In some embodiments, the waveguide layer 124 includes a same material as the grating 140. In some embodiments, the waveguide layer 124 includes a different material from the grating 140. In some embodiments, the waveguide layer 124 is integral with the grating 140. In some embodiments, the waveguide layer 124 is a slab waveguide, a planar waveguide or a light pipe. In order for the grating 140 to effectively couple the optical signal 115 into the waveguide layer 124, the grating 140 redirects the incident optical signal 115 into an angle of acceptance of the waveguide layer 124. The angle of acceptance of the waveguide layer 124 is based on the wavelength of the optical signal, the frequency of the optical signal and dimensions of the waveguide layer 124.

The ILD 126 includes a dielectric material. Contacts are formed through the ILD 126 to electrically connect the optoelectronic component to the interconnect structure 130 and to other components within the chip or to external devices. The ILD 126 is deposited using chemical vapor deposition, physical vapor deposition, or another suitable deposition process. In some embodiments, the ILD 126 has a thickness ranging from about 500 nm to about 3000 nm. If the thickness is too great, an aspect ratio for forming the contacts through the ILD 126 makes reliable manufacturing difficult and absorption of the optical signal 115 reduces the strength of the optical signal to an unacceptable level, in some instances. If the thickness is too small, the ILD 126 fails to provide sufficient electrical insulating between conductors, such as conductive layer 134, and other components in the chip 120. In some embodiments, the ILD 126 includes dielectric materials, such as Si, $Si_3N_4$, $SiO_2$ (e.g., quartz, and glass), Al2O3, and $H_2O$, according to various embodiments of the present disclosure.

The interconnect structure 130 is configured to electrically connect the optoelectronic component to other components within the chip 120 or to external devices, for example, through chip bonding. The interconnect structure includes multiple IMD layers and multiple conductive layer.

The IMD layers includes a dielectric material. The IMD layers provide electrical insulation between the conductive layers and other conductive elements within the chip 120, such as the contacts in the ILD 126. The IMD layers are deposited using chemical vapor deposition, physical vapor deposition, or another suitable deposition process. In some embodiments, the IMD layers have a thickness ranging from about 1,000 angstroms to about 30,000 angstroms. If the thickness is too great, an aspect ratio for forming the electrical connections through the IMD layers makes reliable manufacturing difficult, in some instances. If the thickness is too small, the IMD layers fail to provide sufficient electrical insulating between conductors, and other components in the chip 120. In some embodiments, the IMD layers include dielectric materials, such as Si, $Si_3N_4$, $SiO_2$ (e.g., quartz, and glass), Al2O3, and $H_2O$, according to various embodiments of the present disclosure. In some embodiments, the IMD layers include a low-k dielectric material. In some embodiments, the IMD layers include a same material as the ILD 126. In some embodiments, the IMD layers include a different material from the ILD 126.

The conductive layers are configured to convey electrical signals to various components in the chip 120, for example the optoelectronic component. In some embodiments the conductive layers include a seed layer. In some embodiments, the conductive layers include copper, aluminum, tungsten, alloys thereof or another suitable material.

The cavity 136 reduces an amount of material that the optical signal 115 passes through before being directed into the waveguide layer 124 by the grating 140. The cavity 136 extends through the interconnect structure 130 and through a portion of the ILD 126. In some embodiments, the cavity 136 extends through a portion of the interconnect structure 130. The sidewalls of the cavity 136 are substantially vertical. In some embodiments, the sidewalls of the cavity 136 are tapered. In some embodiments, a width wc of the cavity ranges from about 2.5-times to about 3.5-times more than the width wf of the optical fiber 110. In some embodiments, the width wc ranges from about 25 µm to about 35 µm. This width wc helps to account for misalignment between the optical fiber 110 and the cavity 136. The width wc also helps to permit the entire optical signal 115 to pass through the cavity 136 even though the optical signal 115 will diverge upon exiting from the optical fiber. If the width wc is too small, then misalignment or divergence of the optical signal 115 will increase the risk of loss of a portion of the optical signal 115, in some instances. If the width wc is too great, then routing possibilities in the interconnect structure 130 are reduced or an overall size of the chip 120 is increased, in some instances.

The grating 140 is configured to couple the optical signal 115 from the optical fiber 110 into the waveguide layer 124. The grating 140 directs the optical signal 115 based on an incident angle of the optical signal 115 and dimensions of features of the grating 140. In some embodiments, the grating 140 includes a variable grating section. The variable grating section includes grating features having different geometric dimensions. In some embodiments, the variable grating section includes grating features having a variation in width, depth, pitch or combinations thereof. In some embodiments, the grating 140 includes a uniform grating section. The uniform grating section includes grating features having consistent geometric dimensions. The grating 140 includes an optical transparent material. In some embodiments, the grating 140 includes silicon. In some embodiments, the grating 140 includes plastic. In some embodiments, the grating 140 is integral with the waveguide layer 124.

The low refractive index layer 142 is between the ILD 126 and the waveguide layer 124 and helps to reduce absorption of the optical signal 115 incident on the grating 140 and the optical signal 115 during propagation along the waveguide layer 124. The propagation direction of the optical signal 115 in the waveguide layer 124 of FIG. 1 is horizontal across the page. In some embodiments, the low refractive index layer 142 extends across an entirety of the chip 120. In some embodiments, the low refractive index layer 142 is over the waveguide layer 124, but absent from other portions of the chip 120. In some embodiments, the low refractive index layer has a refractive index less than silicon nitride. In some embodiments, the low refractive index layer 142 has a refractive index of less than 2.0. In some embodiments, the low refractive index layer 142 has a refractive index of less than 1.95. In some embodiments, the low refractive index layer 142 has a refractive index of less than 1.9. If a refractive index of the low refractive index layer 142 is too high, absorption of the optical signal 115 increases to a point where reliability of the optical signal 115 is reduced, in some instances. In some embodiments, the low refractive index layer 142 includes silicon oxide, silicon carbide, silicon oxynitride, silicon carbon oxynitride, aluminum oxide, hafnium oxide, or another suitable low refractive index material. In some embodiments, a thickness of the low refractive index layer 142 ranges from about 400 angstroms (A) to about 600 A. If a thickness of the low refractive index layer 142 is too small, reflection at the interface between the low refractive index layer 142 and the cladding layer 144 is reduced, which increases a risk of absorption by a CESL, in some instances. If a thickness of the low refractive index layer 142 is too great, then material is wasted without a noticeable improvement in performance, in some instances. In some embodiments, the low refractive index layer 142 is omitted and the ILD 126 directly contacts the cladding layer 144 over the waveguide layer 124.

The cladding layer 144 is over the waveguide layer 124 and the grating 140. The cladding layer 144 helps to keep the optical signal 115 within the waveguide layer 124. In some embodiments, a thickness of the cladding layer 144 ranges from about 0.6 microns (µm) to about 3 µm. If the thickness of the cladding layer 144 is too small, then a risk of light penetrating through the cladding layer 144 increases, in some instances. If the thickness of the cladding layer 144 is too great, then material is wasted without a noticeable improvement in performance in some instances. In some embodiments, the cladding layer 144 includes silicon oxide, silicon carbide, silicon oxynitride, silicon carbon oxynitride, aluminum oxide, hafnium oxide, or another suitable material. In some embodiments, the cladding layer 144 and the low refractive index layer 142 include a same material. In some embodiments, the cladding layer 144 and the low refractive index layer 142 include different materials.

Figure 2A:
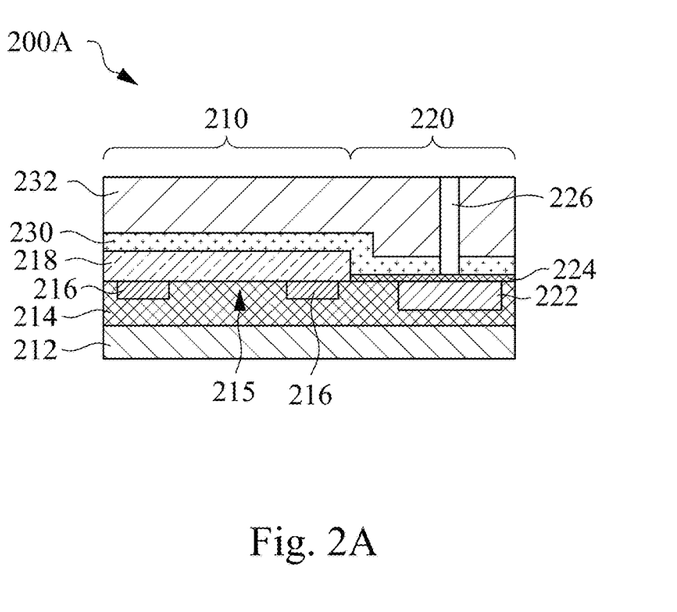
FIGS. 2A-2G are cross-sectional views of a photonic device in accordance with some embodiments.

FIG. 2A is a cross-sectional view of a photonic device 200A in accordance with some embodiments. In some embodiments, the photonic device 200A corresponds to chip 120 (FIG. 1). The photonic device 200A includes a waveguide region 210 and a device region 220. The photonic device 200A includes a bottom cladding layer 212 over a substrate (not shown). A silicon layer 214 is over the bottom cladding layer 212. Isolation structures 216 in the silicon layer 214 define a waveguide portion 215 where the optical signal propagates within the waveguide layer 124. The optical signal in photonic device 200A propagates into the page of FIG. 2A. A top cladding layer 218 is over the silicon layer 214 in the waveguide region 210. An implant region 222 is in the silicon layer 214 in the device region 220. A silicide layer 224 is over the implant region 222 in the device region 220. A contact 226 electrically connects to the implant region 222 through the silicide layer 224. A low refractive index layer 230 is over the top cladding layer 218 and the silicon layer 214. The low refractive index layer 230 extends across both the waveguide region 210 and the device region 220. An ILD 232 is over the low refractive index layer 230.

Bottom cladding layer 212 is below the silicon layer 214. The bottom cladding layer 212 helps to keep the optical signal, e.g. optical signal 115 (FIG. 1), within the waveguide portion 215 of the silicon layer 214. In some embodiments, a thickness of the bottom cladding layer 212 ranges from about 0.6 µm to about 3 µm. If the thickness of the bottom cladding layer 212 is too small, then a risk of light penetrating through the bottom cladding layer 212 increases, in some instances. If the thickness of the bottom cladding layer 212 is too great, then material is wasted without a noticeable improvement in performance in some instances. In some embodiments, the bottom cladding layer 212 includes silicon oxide, silicon carbide, silicon oxynitride, silicon carbon oxynitride, aluminum oxide, hafnium oxide, or another suitable material.

The silicon layer 214 is usable to form transistor structures or other devices, as well as the waveguide portion 215. In some embodiments, a thickness of the silicon layer 214 ranges from about 2,500 Å to about 3,000 Å. If the thickness of the silicon layer 214 is too small, then an ability to form transistor structures is reduced, in some instances. If the thickness of the silicon layer 214 is too large, material is wasted without a noticeably increase in performance resulting in increasing the size of the photonic device 200A needlessly, in some instances.

The isolation structures 216 define the waveguide portion 215. The isolation structures 216 function similar to cladding layer, such as bottom cladding layer 212 and top cladding layer 218, in order to reflect the optical signal back into the waveguide portion 215. In some embodiments, the isolation structures 216 include silicon oxide. In some embodiments, a depth of the isolation structures 216 is less than the thickness of the silicon layer 214. In some embodiments, the depth of the isolation structures 216 extends through an entirety of the silicon layer 214.

Top cladding layer 218 is over the silicon layer 214 in the waveguide region 210. In some embodiments, the top cladding layer 218 is similar to cladding layer 144 (FIG. 1). In some embodiments, the top cladding layer 218 includes a same material as the bottom cladding layer 212. In some embodiments, the top cladding layer 218 includes a different material from the bottom cladding layer 212. In some embodiments, a thickness of the top cladding layer 218 is equal to a thickness of the bottom cladding layer 212. In some embodiments, the thickness of the top cladding layer 218 is different from the thickness of the bottom cladding layer 212.

The implant region 222 is part of a component within the photonic device 200A. In some embodiments, the implant region 222 is part of an optoelectronic component. In some embodiments, the implant region 222 is part of a transistor structure. The implant region 222 is not particularly limiting and is used merely to indicate that an interconnect structure, e.g., interconnect structure 130 (FIG. 1), is able to provide electrical connection through contact 226 to elements within the photonic device 200A. In some embodiments, the implant region 222 is a doped region of the silicon layer 214. In some embodiments, the implant region 222 includes a p-type dopant. In some embodiments, the implant region 222 includes an n-type dopant. In some embodiments, the implant region 222 is a strained source/drain region.

The silicide layer 224 provides electrical connection between the implant region 222 and the contact 226. The silicide layer 224 is includes a compound including silicon and a metal, such as nickel, tungsten, aluminum or another suitable metal. In some embodiments, the top cladding layer 218 is used as a mask during formation of the silicide layer 224, so that the silicide layer 224 is a self-aligned silicide layer, i.e., a salicide layer.

The contact 226 is a via that electrically connects to the implant region 222 through the silicide layer 224. The contact 226 includes a conductive material. In some embodiments, the contact 226 includes copper, aluminum, tungsten or another suitable conductive material.

The low refractive index layer 230 is configured to reduce absorption of the optical signal propagating through the waveguide portion 215. In some embodiments, the low refractive index layer 230 is similar to the low refractive index layer 142 (FIG. 1). The low refractive index layer 230 is a continuous layer extending across both the waveguide region 210 and the device region 220. In the waveguide region 210 the low refractive index layer 230 is over the top cladding layer 218. In the device region 220 the low refractive index layer 230 is over the silicide layer 224. A top-most surface of the low refractive index layer 230 in the device region 220 is below a top-most surface of the low refractive index layer 230 in the waveguide region 210. The low refractive index layer 230 extends along a sidewall of the top cladding layer 218. By including the low refractive index layer 230, the photonic device 200A exhibits less optical signal loss due to absorption in comparison with approaches that includes a CESL over the waveguide portion 215.

The ILD 232 is over the low refractive index layer 230. The ILD 232 is a lowest dielectric layer of an interconnect structure. In some embodiments, the ILD 232 is similar to ILD 126 (FIG. 1). A thickness of the ILD 232 in the waveguide region 210 is less than a thickness of the ILD 232 in the device region 220 due to the presence of the top cladding layer 218 in the waveguide region 210.

Figure 2B:
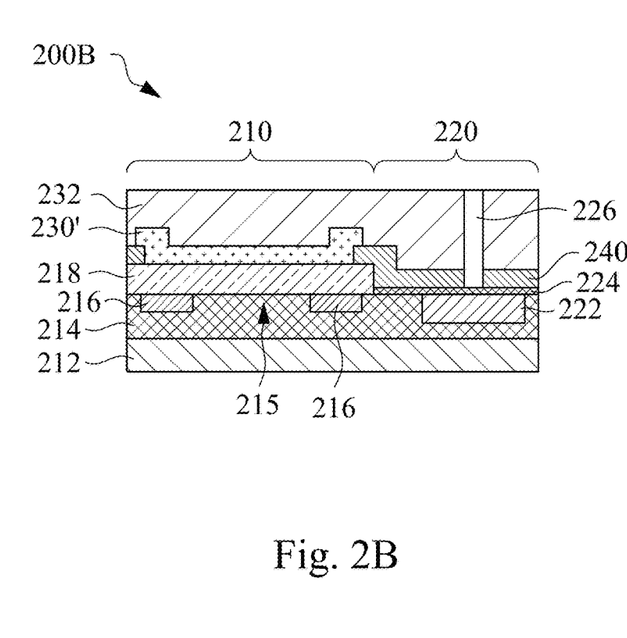

FIG. 2B is a cross-sectional view of a photonic device 200B in accordance with some embodiments. The photonic device 200B is similar to the photonic device 200A (FIG. 2A) and description of similar elements is omitted for the sake of brevity. In comparison with the photonic device 200A, the photonic device 200B includes low refractive index layer 230' over a portion of the waveguide region 210, but not over the device region 220. The photonic device 200B further includes a contact etch stop layer (CESL) 240. The CESL 240 extends over the device region 220 and into the waveguide region 210. The CESL 240 defines an opening over the waveguide portion 215; and the low refractive index layer 230' extends into the opening.

The CESL 240 has a different etch chemistry from the ILD 232. In some embodiments, the CESL 240 is deposited using chemical vapor deposition or another suitable deposition process. In some embodiments, the CESL 240 includes $Si_3N_4$, or another suitable material. In some other embodiments, the CESL 240 has a thickness in a range of about 250 nm to about 350 nm. If the thickness of the CESL 240 is too great, then material is wasted without a noticeable impact on performance, in some instances. If the thickness of the CESL 240 is too small, then a risk of etching through the CESL 240 during the formation of the contact 226 or other electrical connections increases, in some instances.

The low refractive index layer 230' is similar to the low refractive index layer 230 (FIG. 2A). The low refractive index layer 230' overlaps the CESL 240 at edges of the opening in the CESL 240. In some embodiments, the low refractive index layer 230' does not overlap edges of the CESL 240. In some embodiments, a top-most surface of the low refractive index layer 230' is coplanar with a top-most surface of the CESL 240. By including the low refractive index layer 230' over the waveguide portion 215, the photonic device 200B exhibits similar performance as photonic device 200A (FIG. 2A).

Figure 2C:
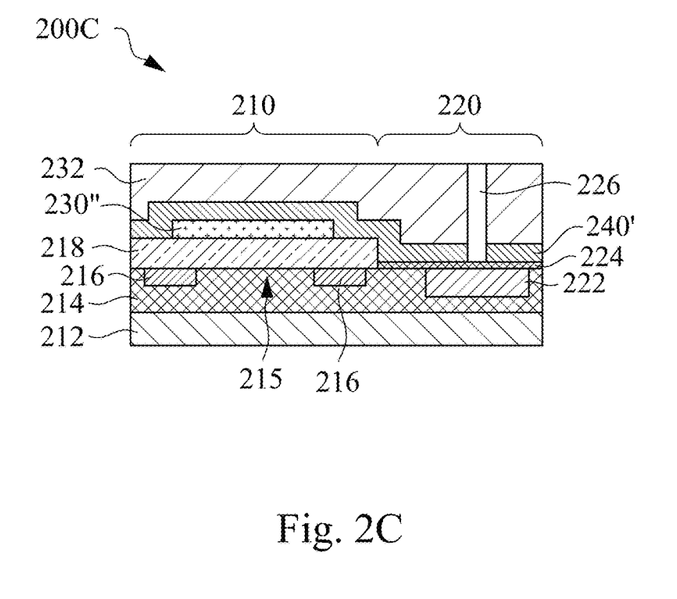

FIG. 2C is a cross-sectional view of a photonic device 200C in accordance with some embodiments. The photonic device 200C is similar to the photonic device 200B (FIG. 2B) and description of similar elements is omitted for the sake of brevity. In comparison with the photonic device 200B, the photonic device 200C includes CESL 240' over low refractive index layer 230". The CESL 240' is a continuous layer extending over the device region 220 and the waveguide region 210. In contrast with the photonic device 200B, in photonic device 200C the low refractive index layer 230" does not extends over a top surface of the CESL 240'. The CESL 240' directly contacts a top surface of the top cladding layer 218 beyond a boundary of the waveguide portion 215. However, the low refractive index layer 230" directly contacts the top surface of the top cladding layer over the waveguide portion 215. A top surface of the CESL 240' over the low refractive index layer 230" is offset with respect to a top surface of the CESL 240' in direct contact with the top cladding layer 218. Similarly, the top surface of the CESL 240' in direct contact with the top cladding layer 218 is offset with respect to a top surface of the CESL 240' in the device region 220. By including the low refractive index layer 230" over the waveguide portion 215, the photonic device 200C exhibits reduced loss of an optical signal than in a device which includes the CESL 240' in direct contact with the top cladding layer over the waveguide portion 215. However, the loss of optical signal in the photonic device 200C more prevalent than in the photonic device 200A (FIG. 2A) or the photonic device 200B (FIG. 2B).

Figure 2D:
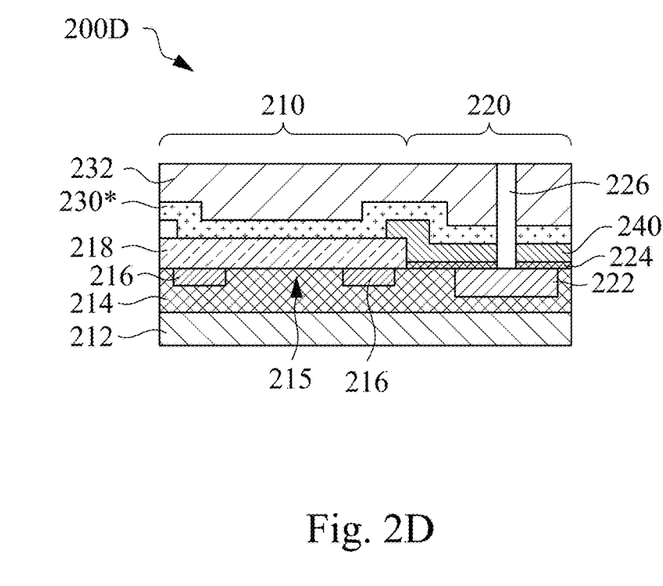

FIG. 2D is a cross-sectional view of a photonic device 200D in accordance with some embodiments. The photonic device 200D is similar to the photonic device 200B (FIG. 2B) and description of similar elements is omitted for the sake of brevity. In comparison with the photonic device 200B, the photonic device 200D includes low refractive index layer 230* that is a continuous layer over the CESL 240 in both the waveguide region 210 and the device region 220. By including the low refractive index layer 230' over the waveguide portion 215 without the overlying CESL 240' of photonic device 200C (FIG. 2C), the photonic device 200D exhibits similar performance as photonic device 200A (FIG. 2A) and the photonic device 200B (FIG. 2B).

Figure 2E:
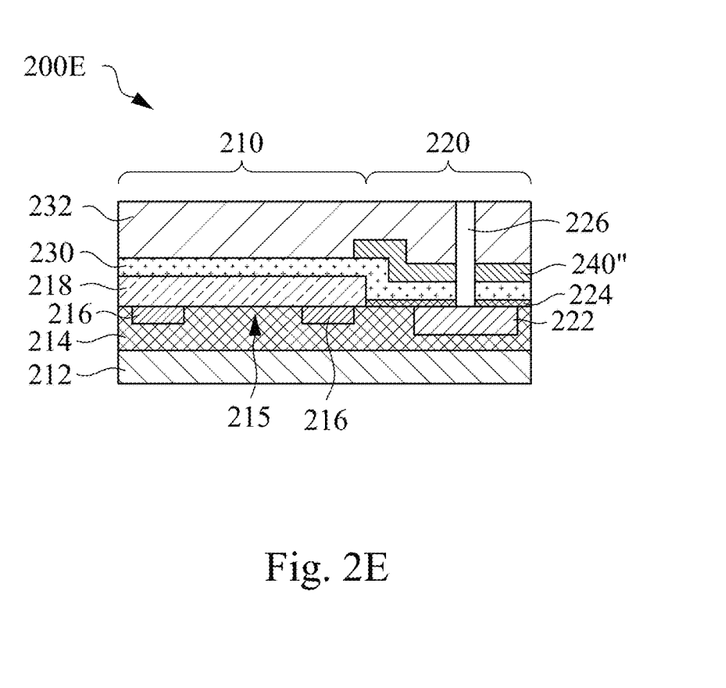

FIG. 2E is a cross-sectional view of a photonic device 200E in accordance with some embodiments. The photonic device 200E is similar to the photonic device 200A (FIG. 2A) and description of similar elements is omitted for the sake of brevity. In comparison with the photonic device 200A, the photonic device 200E includes the CESL 240" over the low refractive index layer 230 in the device region 220. In some embodiments, the CESL 240" extends above a portion of the top cladding layer 218 outside of the boundary of the waveguide portion 215. In some embodiments, the CESL 240" is only in the device region 220. By including the low refractive index layer 230 over the waveguide portion 215 without the overlying CESL 240' of photonic device 200C (FIG. 2C), the photonic device 200E exhibits similar performance as photonic device 200A (FIG. 2A), the photonic device 200B (FIG. 2B) and the photonic device 200D (FIG. 2D).

Figure 2F:
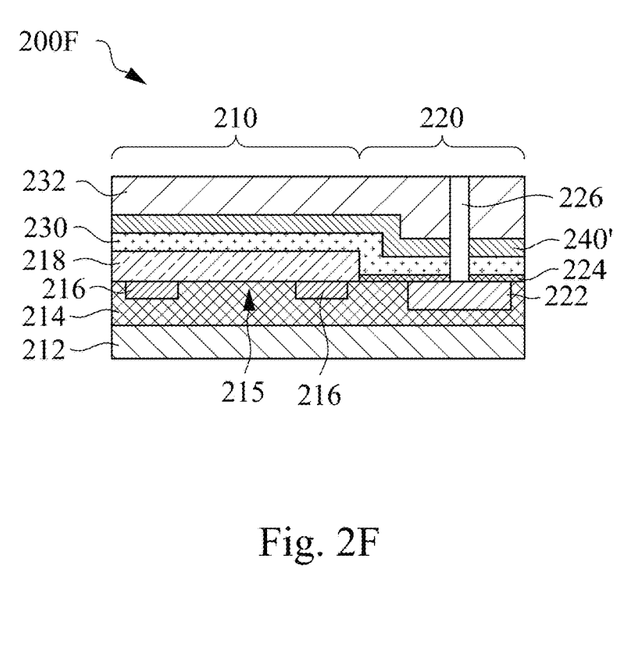

FIG. 2F is a cross-sectional view of a photonic device 200F in accordance with some embodiments. The photonic device 200F is similar to the photonic device 200E (FIG. 2E) and description of similar elements is omitted for the sake of brevity. In comparison with the photonic device 200E, the photonic device 200F includes the CESL 240' as a continuous layer over the low refractive index layer 230 in both the waveguide region 210 and the device region 220. By including the low refractive index layer 230 over the waveguide portion 215 but also includes the CESL 240' over the waveguide portion 215, the photonic device 200F exhibits similar performance as the photonic device 200C (FIG. 2C).

Figure 2G:
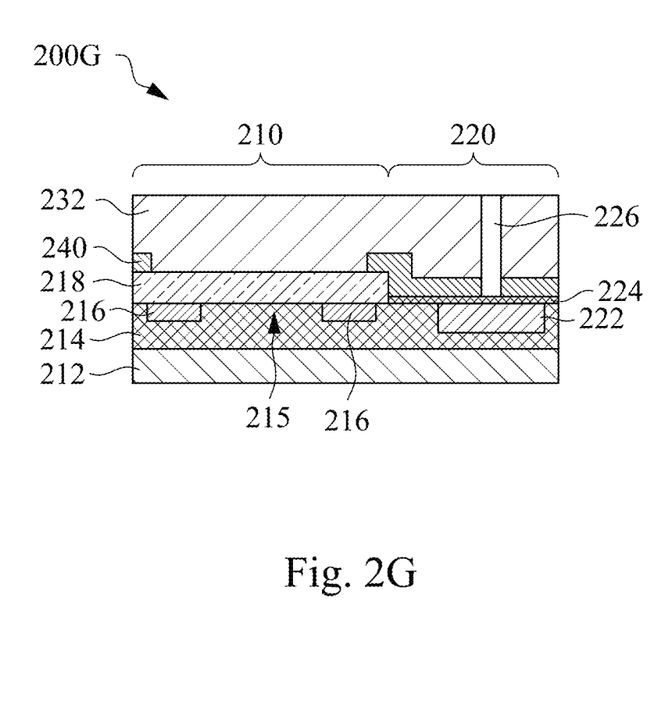

FIG. 2G is a cross-sectional view of a photonic device 200G in accordance with some embodiments. The photonic device 200G is similar to the photonic device 200B (FIG. 2B) and description of similar elements is omitted for the sake of brevity. In comparison with the photonic device 200B, the photonic device 200G is free of a low refractive index layer. Instead, the ILD 232 directly contacts the top cladding layer 218 over the waveguide portion 215. By omitting an additional interface, e.g., an interface between a low refractive index layer 230 and the ILD 232, the photonic device 200G is able to exhibit improved performance even in comparison to photonic device 200A (FIG. 2A).

Figure 3:
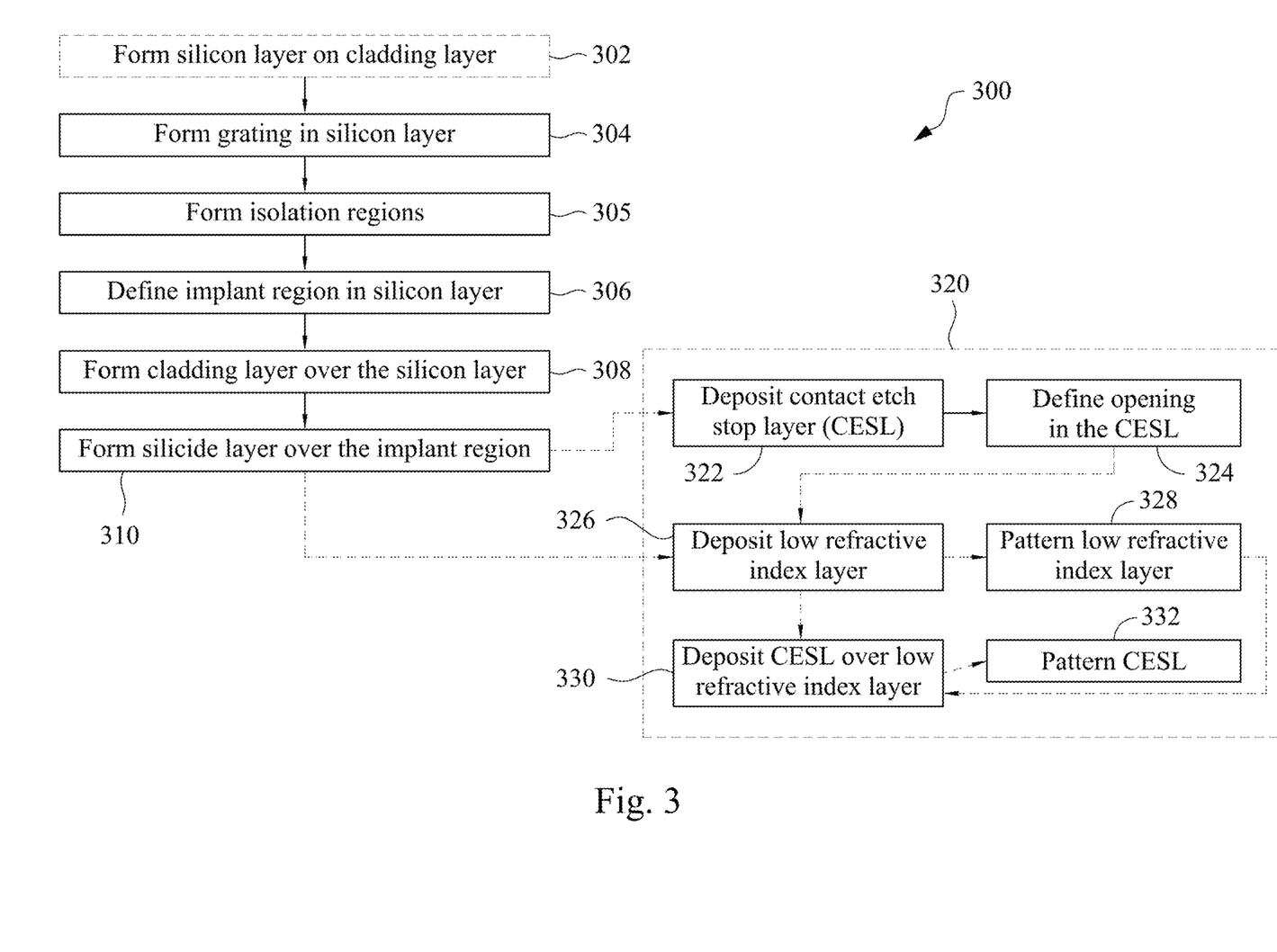
FIG. 3 is a flowchart of a method of making a photonic device in accordance with some embodiments.

FIG. 3 is a flowchart of a method 300 of making a photonic device in accordance with some embodiments. Method 300 includes optional operation 302 in which a silicon layer is formed on a cladding layer. In some embodiments, the silicon layer is deposited using low pressure chemical vapor deposition. In some embodiments, the silicon layer is deposited using a silane gas precursor. In some embodiments, operation 302 is omitted when the substrate is an SOI substrate, wherein the insulator serves as the cladding layer. In some embodiments, operation 302 is omitted because the SOI substrate is provided by an outside vendor.

In operation 304 a grating is formed on the silicon layer. In some embodiments, the grating is formed using silicon, plastic or another suitable material. In some embodiments, the silicon layer and the grating for integral and a single layer is deposited and then patterned to define the grating as part of the silicon layer. In some embodiments, the silicon is deposited using chemical vapor deposition. In some embodiments, the plastic is deposited using spin on coating, chemical vapor deposition, or another suitable technique. In some embodiments, the grating is patterned using photolithography and etching. In some embodiments, the grating includes a variable grating region. In some embodiments, the grating includes a uniform grating region. In some embodiments, the grating includes a combination of a variable grating region and a uniform grating region.

Figure 4A:
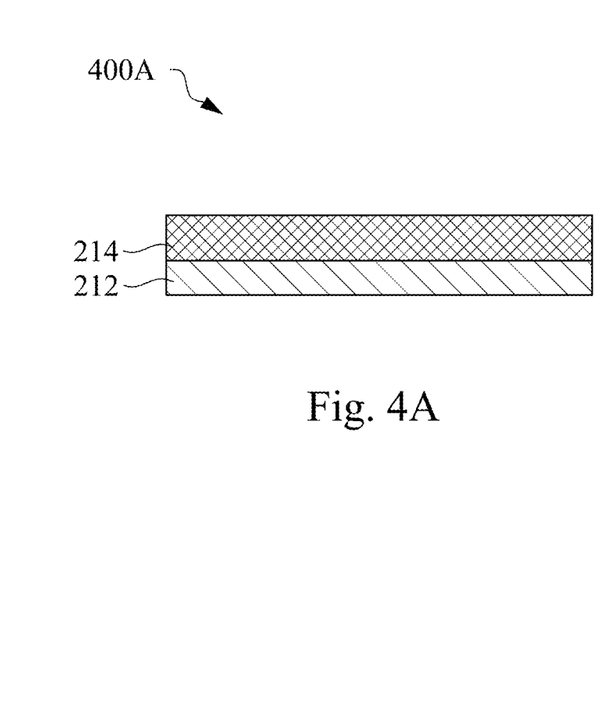
FIGS. 4A-4E are cross-sectional views of a photonic device at various stages of production in accordance with some embodiments.

FIG. 4A is a cross-sectional view of a photonic device 400A following operation 304 in accordance with some embodiments. Elements of the photonic device 400A are similar to elements of the photonic device 200A (FIG. 2A) and description of these elements are omitted for the sake of brevity. The photonic device 400A includes a silicon layer 214 over a bottom cladding layer 212.

Returning to method 300, in operation 305 isolation regions are formed in the silicon layer. In some embodiments, the isolation regions are formed by etching the silicon layer to define recesses. The recesses are then filled with an insulating material, such as silicon oxide. In some embodiments, the isolation regions are formed using local oxidation of silicon (LOCOS). The isolation regions define a waveguide portion in the silicon layer.

Figure 4B:
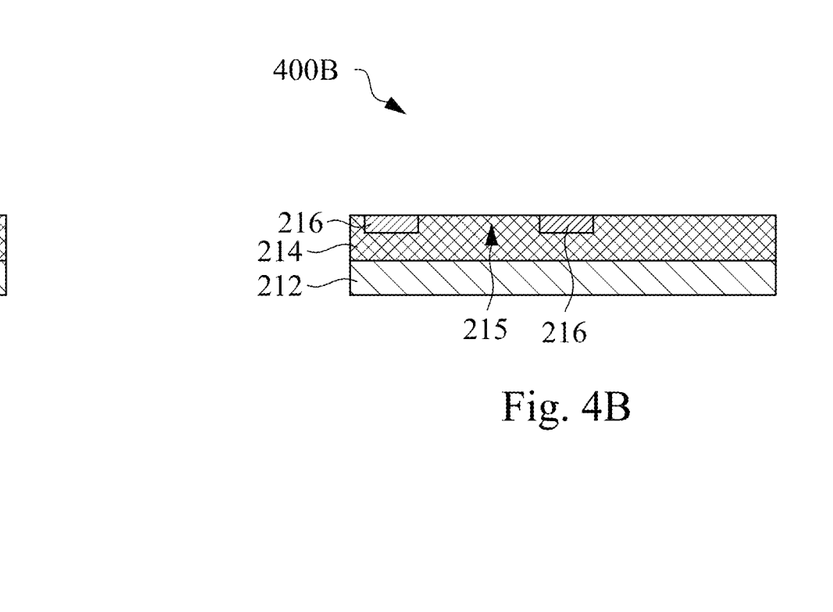

FIG. 4B is a cross-sectional view of a photonic device 400B following operation 305 in accordance with some embodiments. Elements of the photonic device 400B are similar to elements of the photonic device 200A (FIG. 2A) and description of these elements are omitted for the sake of brevity. In comparison with the photonic device 400A, the photonic device 400B includes isolation regions 216 defining a waveguide portion 215 in the silicon layer 214.

Returning to method 300, in operation 306 an implant region is formed in the silicon layer. In some embodiments, the implant region is formed by ion implantation. In some embodiments, the implant region is formed by recessing the substrate and growing strained features in the recesses.

Figure 4C:
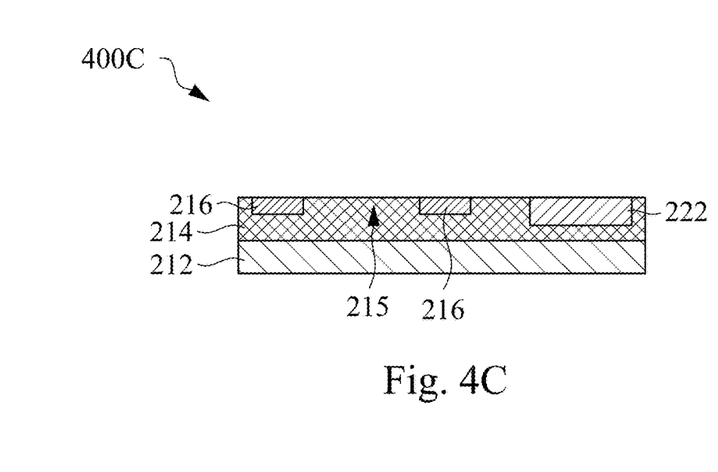

FIG. 4C is a cross-sectional view of a photonic device 400C following operation 306 in accordance with some embodiments. Elements of the photonic device 400B are similar to elements of the photonic device 200A (FIG. 2A)

and description of these elements are omitted for the sake of brevity. In comparison with the photonic device 400B, the photonic device 400C includes implant region 222 in silicon layer 214.

Returning to method 300, in operation 308 a cladding layer is formed over the silicon layer. In some embodiments, the cladding layer is formed by oxidizing a portion of the silicon layer. In some embodiments, the cladding layer is formed by deposition of a cladding material and then patterning the cladding material using photolithography and etching processes. In some embodiments, the deposition of the cladding material includes chemical vapor deposition. In some embodiments, the etching process includes wet etching or dry etching. In some embodiments, a photoresist is used in the patterning process. The patterning process removes the cladding material from a device region of the photonic device.

Figure 4D:
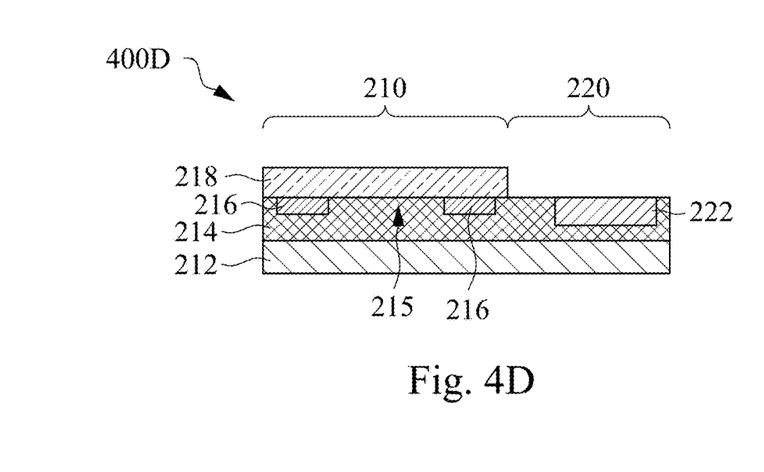

FIG. 4D is a cross-sectional view of a photonic device 400D following operation 308 in accordance with some embodiments. Elements of the photonic device 400D are similar to elements of the photonic device 200A (FIG. 2A) and description of these elements are omitted for the sake of brevity. In comparison with the photonic device 400C, the photonic device 400D includes top cladding layer 218 over the waveguide portion 215 of the waveguide region 210 of the photonic device 400D. The silicon layer 214 is exposed in the device region 220.

Returning to method 300, in operation 310 a silicide layer is formed over the implant region. In some embodiments, the silicide layer is formed by depositing a metal-containing layer over the implant region and the silicon layer. An annealing process is then performed and the metal-containing layer reacts with silicon in the silicon layer and the implant region to form a silicide layer. In some embodiments, the cladding layer formed in operation 308 is used as a mask for depositing the metal-containing layer, so that the silicide layer is a salicide layer.

Figure 4E:
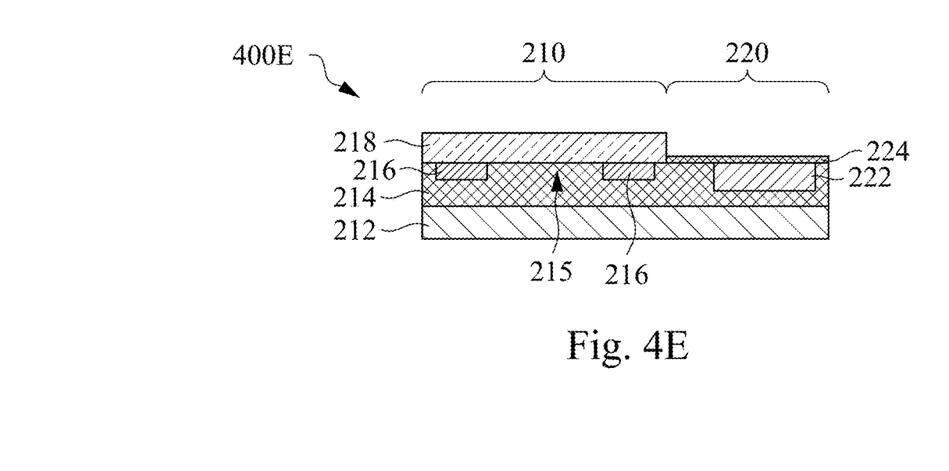

FIG. 4E is a cross-sectional view of a photonic device 400D following operation 310 in accordance with some embodiments. Elements of the photonic device 400E are similar to elements of the photonic device 200A (FIG. 2A) and description of these elements are omitted for the sake of brevity. In comparison with the photonic device 400D, the photonic device 400E includes silicide layer 224 over the implant region 222.

Returning to method 300, a layer formation block 320 includes various operations for forming different embodiments of photonic devices. The layer formation block 320 includes various operations to form a low refractive index layer and/or a CESL.

In operation 322 a CESL is deposited. In some embodiments, the CESL includes silicon nitride or another suitable material. In some embodiments, the CESL is deposited using chemical vapor deposition. In some embodiments, a thickness of the CESL ranges from about 800 A to about 1,000 A. If the thickness of the CESL is too small, then a risk of inadvertently etching through the CESL increases, in some instances. If the thickness of the CESL is too great, material is wasted without a noticeable increase in performance and a size of the chip is increased needlessly, in some instances. In some embodiments, the CESL is deposited to form a conformal layer.

In operation 324 an opening is defined in the CESL. The opening in the CESL is over the waveguide portion, e.g., waveguide portion 215 (FIGS. 2A-2G), in the silicon layer. The opening is formed in the CESL by a combination of photolithography and etching processes, in some embodiments. In some embodiments, the etching process is wet etching or dry etching. In some embodiments, a photoresist is used to determine the location of the opening.

In operation 326 a low refractive index layer is deposited. The low refractive index layer is over the waveguide portion, e.g., waveguide portion 215 (FIGS. 2A-2G), in the silicon layer. In some embodiments, the low refractive index layer is a continuous layer, i.e., blanket deposited, extending across both the waveguide region and the device region. In some embodiments, the low refractive index layer has a refractive index less than silicon nitride. In some embodiments, the low refractive index layer 142 has a refractive index of less than 2.0. In some embodiments, the low refractive index layer 142 has a refractive index of less than 1.95. In some embodiments, the low refractive index layer 142 has a refractive index of less than 1.9. If a refractive index of the low refractive index layer is too high, absorption of the optical signal increases to a point where reliability of the optical signal is reduced, in some instances. In some embodiments, the low refractive index layer includes silicon oxide, silicon carbide, silicon oxynitride, silicon carbon oxynitride, aluminum oxide, hafnium oxide, or another suitable low refractive index material. In some embodiments, a thickness of the low refractive index layer ranges from about 400 angstroms (A) to about 600 A. If a thickness of the low refractive index layer is too small, reflection at the interface between the low refractive index layer and the cladding layer is reduced, which increases a risk of absorption by a CESL, in some instances. If a thickness of the low refractive index layer is too great, then material is wasted without a noticeable improvement in performance, in some instances.

In operation 328 the low refractive index layer is patterned. The patterning removes portions of the low refractive index layer that are not over the waveguide portion, e.g., waveguide portion 215 (FIGS. 2A-2G), in the silicon layer. The patterning is performed by a combination of photolithography and etching processes, in some embodiments. In some embodiments, the etching process is wet etching or dry etching. In some embodiments, a photoresist is used to determine the location of portions of the low refractive index layer that are removed.

In operation 330 a CESL is deposited over the low refractive index layer. Operation 330 is similar to operation 322 and the details of the operation are not described in detail for the sake of brevity.

In operation 332 the CESL is patterned. Operation 332 is similar to operation 324 and details of the operation are not described in detail for the sake of brevity.

One of ordinary skill in the art would recognize that the various operations within the layer formation block 320 are executable in different orders and combinations to form different structures of photonic devices. For example, in some embodiments, the photonic device 200A (FIG. 2A) is formed by executing only operation 326 in the layer formation block 320. For example, in some embodiments, the photonic device 200B (FIG. 2B) is formed by executing operation 322, the operation 324, the operation 326, the operation 328 from the layer formation block 320. For example, in some embodiments, the photonic device 200C (FIG. 2C) is formed by executing operation 326, the operation 328, the operation 330 from the layer formation block 320. For example, in some embodiments, the photonic device 200D (FIG. 2D) is formed by executing operation 322, the operation 324, the operation 326 from the layer formation block 320. For example, in some embodiments, the photonic device 200E (FIG. 2E) is formed by executing operation 326, the operation 330, the operation 332 from the layer formation block 320. For example, in some embodiments, the photonic device 200F (FIG. 2F) is formed by executing operation 326, the operation 330 from the layer formation block 320. For example, in some embodiments, the photonic device 200G (FIG. 2G) is formed by executing operation 322, the operation 324 from the layer formation block 320. One of ordinary skill in the art would recognize that different combinations of operations in order to form different photonic devices are within the scope of this description.

In some embodiments, method 300 includes additional operations. For example, in some embodiments, the method 300 includes formation of an interconnect structure, e.g., interconnect structure 130 (FIG. 1). In some embodiments, at least one operation in the method 300 is omitted. For example, in some embodiments, the operation 302 is omitted if the substrate is an SOI substrate. In some embodiments, an order of operations of the method 300 is changed. For example, in some embodiments, different combinations and sequences of operations within the layer formation block 320 form different photonic devices.

By removing the CESL from directly contacting the top cladding layer over a waveguide portion, absorption of an optical signal propagating along the waveguide portion is reduced. As a result, the intensity of the optical that reaches an optoelectronic component of the photonic device is greater and performance of the photonic device is more reliable.

An aspect of this description relates to a photonic device. The photonic device includes a silicon layer, wherein the silicon layer extends from a waveguide region of the photonic device to a device region of the photonic device, and the silicon layer includes a waveguide portion in the waveguide region. The photonic device further includes a cladding layer over the waveguide portion, wherein the device region is free of the cladding layer. The photonic device further includes a low refractive index layer in direct contact with the cladding layer, wherein the low refractive index layer comprises silicon oxide, silicon carbide, silicon oxynitride, silicon carbon oxynitride, aluminum oxide or hafnium oxide. The photonic device further includes an interconnect structure over the low refractive index layer. In some embodiments, the low refractive index layer is a continuous layer extending from the waveguide region into the device region. In some embodiments, the photonic device further includes a contact etch stop layer (CESL) over the low refractive index layer, wherein a sidewall of the CESL is outside of a boundary of the waveguide region in a direction parallel to a top surface of the silicon layer. In some embodiments, the photonic device further includes a CESL in the device region, wherein the CESL defines an opening over the waveguide portion, and the low refractive index layer is in the opening. In some embodiments, the low refractive index layer is a continuous layer extending from the waveguide region into the device region. In some embodiments, the photonic device further includes a CESL, wherein the CESL is over a continuous layer extending from the waveguide region into the device region, and the CESL is over the low refractive index layer. In some embodiments, the device region is free of the low refractive index layer. In some embodiments, the photonic device further includes a CESL in the device region, wherein the CESL defines an opening over the waveguide portion, the low refractive index layer comprises silicon oxide, and the cladding layer comprises silicon oxide.

An aspect of this description relates to a system. The system includes an optical fiber configured to carry an optical signal. The system further includes a photonic device in optical communication with the optical fiber. The photonic device includes a silicon layer, wherein the silicon layer includes a grating and a waveguide portion, wherein the grating is configured to optically couple the waveguide portion to the optical fiber. The photonic device further includes a cladding layer over the waveguide portion. The photonic device further includes a low refractive index layer in direct contact with the cladding over the waveguide portion, wherein a refractive index of the low refractive index layer is less than a refractive index of silicon nitride. The photonic device further includes an interconnect structure over the low refractive index layer. In some embodiments, the low refractive index layer comprises silicon oxide, silicon carbide, silicon oxynitride, silicon carbon oxynitride, aluminum oxide or hafnium oxide. In some embodiments, the low refractive index layer is over the grating. In some embodiments, the photonic device further includes a contact etch stop layer (CESL) over the silicon layer. In some embodiments, the CESL defines an opening over the waveguide portion, and the low refractive index layer is in the opening. In some embodiments, the CESL contacts a sidewall of the low refractive index layer. In some embodiments, the CESL comprises silicon nitride. In some embodiments, the CESL is over the low refractive index layer.

An aspect of this description relates to a method of making a photonic device. The method includes depositing a cladding layer over a silicon layer. The method further includes patterning the cladding layer to expose a first portion of the silicon layer, wherein a second portion of the silicon layer is covered by the patterned cladding layer, and a waveguide portion is in the second portion of the silicon layer. The method further includes depositing a low refractive index layer directly over the patterned cladding layer, wherein a refractive index of the low refractive index layer is less than a refractive index of silicon nitride. In some embodiments, the method further includes patterning the low refractive index layer to remove the low refractive index layer from the first portion of the silicon layer. In some embodiments, the method further includes depositing a contact etch stop layer (CESL) over the first portion of the silicon layer. In some embodiments, depositing the CESL includes depositing the CESL over the low refractive index layer.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:
1. A photonic device comprising:
 a silicon layer, wherein the silicon layer extends from a waveguide region of the photonic device to a device region of the photonic device, and the silicon layer includes a waveguide portion in the waveguide region;

a cladding layer over the waveguide portion, wherein the device region is free of the cladding layer;

a low refractive index layer in direct contact with the cladding layer, wherein the low refractive index layer comprises silicon oxide, silicon carbide, silicon oxynitride, silicon carbon oxynitride, aluminum oxide or hafnium oxide; and an interconnect structure over the low refractive index layer.

2. The photonic device of claim 1, wherein the low refractive index layer is a continuous layer extending from the waveguide region into the device region.

3. The photonic device of claim 2, further comprising a contact etch stop layer (CESL) over the low refractive index layer, wherein a sidewall of the CESL is outside of a boundary of the waveguide region in a direction parallel to a top surface of the silicon layer.

4. The photonic device of claim 1, further comprising a CESL in the device region, wherein the CESL defines an opening over the waveguide portion, and the low refractive index layer is in the opening.

5. The photonic device of claim 4, wherein the low refractive index layer is a continuous layer extending from the waveguide region into the device region.

6. The photonic device of claim 1, further comprising a CESL, wherein the CESL is over a continuous layer extending from the waveguide region into the device region, and the CESL is over the low refractive index layer.

7. The photonic device of claim 6, wherein the device region is free of the low refractive index layer.

8. The photonic device of claim 1, further comprising a CESL in the device region, wherein the CESL defines an opening over the waveguide portion, the low refractive index layer comprises silicon oxide, and the cladding layer comprises silicon oxide.

9. A system comprising:
an optical fiber configured to carry an optical signal; and
a photonic device in optical communication with the optical fiber, wherein the photonic device comprises:
a device region;
a silicon layer, wherein the silicon layer includes a grating and a waveguide portion, wherein the grating is configured to optically couple the waveguide portion to the optical fiber;
a cladding layer over the waveguide portion, wherein the device region is free of the cladding layer;
a low refractive index layer in direct contact with the cladding over the waveguide portion, wherein a refractive index of the low refractive index layer is less than a refractive index of silicon nitride, and the low refractive index layer comprises silicon oxide, silicon carbide, silicon oxynitride, silicon carbon oxynitride, aluminum oxide or hafnium oxide; and
an interconnect structure over the low refractive index layer.

10. The system of claim 9, wherein the cladding layer directly contacts the grating.

11. The system of claim 9, wherein the low refractive index layer is over the grating.

12. The system of claim 9, further comprising a contact etch stop layer (CESL) over the silicon layer.

13. The system of claim 12, wherein the CESL defines an opening over the waveguide portion, and the low refractive index layer is in the opening.

14. The system of claim 12, wherein the CESL contacts a sidewall of the low refractive index layer.

15. The system of claim 12, wherein the CESL comprises silicon nitride.

16. The system of claim 12, wherein the CESL is over the low refractive index layer.

17. A photonic device comprising:
a silicon layer, wherein the silicon layer extends from a waveguide region of the photonic device to a device region of the photonic device, the silicon layer includes a waveguide portion in the waveguide region, and the silicon layer includes a grating for optically coupling an incident beam with the waveguide portion;
a cladding layer over the waveguide portion, wherein the device region is free of the cladding layer;
a low refractive index layer in direct contact with the cladding layer, wherein the low refractive index layer comprises silicon oxide, silicon carbide, silicon oxynitride, silicon carbon oxynitride, aluminum oxide or hafnium oxide; and
an interconnect structure over the low refractive index layer.

18. The photonic device of claim 17, wherein the cladding layer directly contacts the grating.

19. The photonic device of claim 17, wherein the interconnect structure defines a cavity therein.

20. The photonic device of claim 19, wherein the grating is aligned with the cavity.

* * * * *